United States Patent
Takenaga et al.

(10) Patent No.: US 7,518,490 B2
(45) Date of Patent: Apr. 14, 2009

(54) METHOD AND SYSTEM OF MONITORING AROUND A VEHICLE

(75) Inventors: Hiroshi Takenaga, Naka (JP); Yukio Asou, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 11/447,935

(22) Filed: Jun. 7, 2006

(65) Prior Publication Data
US 2007/0008091 A1 Jan. 11, 2007

(30) Foreign Application Priority Data
Jun. 9, 2005 (JP) .............................. 2005-169182

(51) Int. Cl.
*B60Q 1/00* (2006.01)
(52) U.S. Cl. ...................... 340/435; 340/903; 340/937; 348/149
(58) Field of Classification Search ................. 340/937, 340/903, 435, 436; 348/148–153
See application file for complete search history.

(56) References Cited

U.S. PATENT DOCUMENTS

| | | | |
|---|---|---|---|
| 6,298,290 B1 * | 10/2001 | Abe et al. ..................... 701/35 |
| 7,139,412 B2 * | 11/2006 | Kato et al. ................... 382/104 |
| 7,289,019 B1 * | 10/2007 | Kertes ......................... 340/435 |
| 2003/0069695 A1 * | 4/2003 | Imanishi et al. ............. 701/301 |
| 2004/0051634 A1 * | 3/2004 | Schofield et al. ............ 340/461 |
| 2005/0114000 A1 * | 5/2005 | Cashler ....................... 701/45 |

OTHER PUBLICATIONS

Keiji Saneyoshi: "Obstacles Detection Equipment for Automobile which uses Stereo Cameras" First conference toward practical use of video image processing, Subaru Research Corporation, Mar. 13, 1997, pp. 14-17.

* cited by examiner

*Primary Examiner*—Brent Swarthout
(74) *Attorney, Agent, or Firm*—Crowell & Moring LLP

(57) ABSTRACT

Integrated processing unit captures range images shot by CCD cameras which are respectively provided on front, rear, left and right sides of a vehicle and image processor. Location-allocation unit creates a location-allocation model of an obstacle from the range images and road surface images (heights of images above road surface). Vehicular swept path calculating unit calculates a swept path of each representative point. Collision decision calculates intersection of the obstacle of the location-allocation model with the swept paths of the representative points and judges whether the points cross the obstacle. When a representative point may possibly cross the obstacle, the point is enhanced and displayed together with the obstacle (object) on monitor.

6 Claims, 7 Drawing Sheets

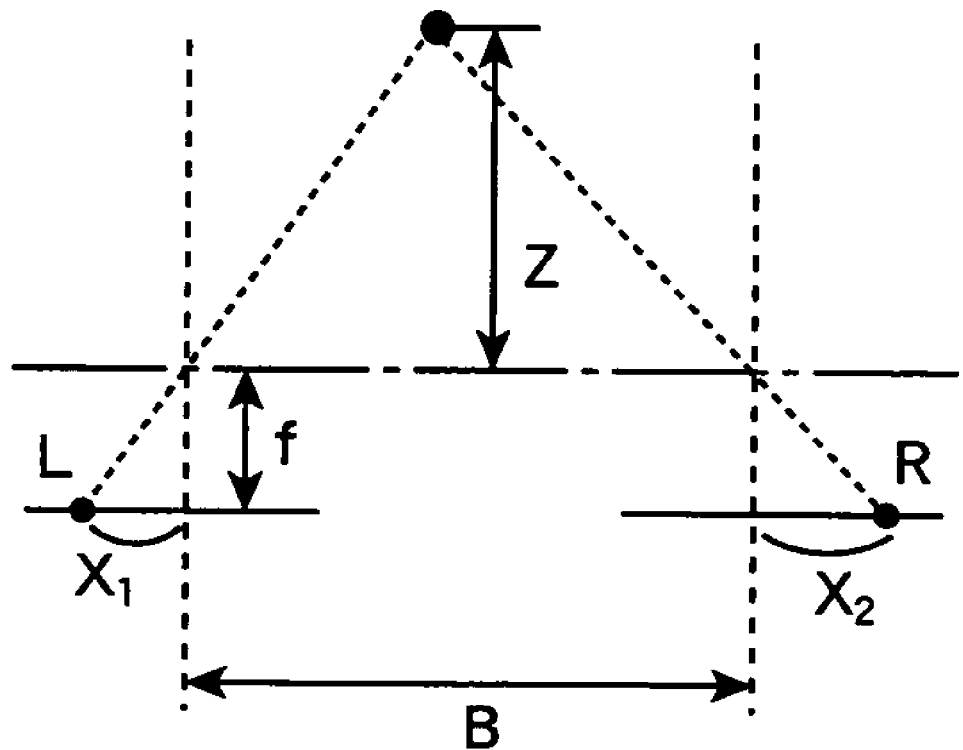

METHOD AND SYSTEM OF MONITORING AROUND A VEHICLE

CLAIM OF PRIORITY

The present application claims priority from Japanese application serial no. 2005-169182, filed on Jun. 9, 2005, the content of which is hereby incorporated by reference into this application.

FIELD OF THE INVENTION

This invention relates to a method and a system of monitoring around a vehicle using range images.

BACKGROUND OF THE INVENTION

In Japan, criteria of visibility to monitoring of side and front dead angles of a vehicle have been enshrined into law (in January, 2005) and provision of cameras on vehicles will be propagated rapidly. Some of already commercialized vehicles are equipped with cameras in their side mirrors and front nose and a monitor unit to display the images captured by the camera.

Keiji Saneyoshi: "Obstacle detection equipment for automobile which uses stereo cameras", First conference toward practical use of video image processing 1997. 3, Subaru Laboratory, proposes obstacle detection equipment for automobile which uses stereo cameras. The equipment captures range images from left and right cameras, recognizes objects such as cars, pedestrians, trees, walls, and guardrails, and obtains information to detect characteristics of objects such as their three-dimensional positions, sizes, shapes, and motions.

SUMMARY OF THE INVENTION

The above technology displays an obstacle on the monitor screen and enables the driver to determine whether the vehicle may cross the obstacle by images on the screen. Even when an obstacle is displayed together with an alarm sound, the driver cannot know what part of the vehicle will touch or run on the obstacle at a glance.

In consideration of the above problems, an object of this invention is to provide a method and system of monitoring around a vehicle which facilitate driver's quick decisions and safety activities.

To accomplish the above object, a method of monitoring around own vehicle using plural cameras with a range measurement function in accordance with this invention comprises the steps of capturing range images from the cameras which are provided on plural positions of the vehicle, creating a location-allocation model of an object found in the range images, inputting vehicle speed, acceleration, and steering angle values, calculating a running path of the vehicle, checking whether the running path of the vehicle crosses the object of the location-allocation model, and displaying the object and a part of the vehicle which may cross the object if the running path of the vehicle crosses the obstacle.

The vehicular swept paths are calculated for the predetermined plural representative points and the representative points of the vehicle that cross the object are handled as parts that may hit the object.

An apparatus of monitoring around a vehicle in accordance with this invention is equipped with on-board equipment and plural cameras with a range measurement function, comprises an input unit which captures range images from the cameras which are provided on plural positions of the vehicle, a location-allocation model creating unit which creates a location-allocation model of an object found in the range images, a path calculating unit which inputs vehicle speed, acceleration, and steering angle values and calculates running paths of plural predetermined representative points of the vehicle, a collision judging unit which judges whether the running path of the vehicle crosses the object of the location-allocation model, and a monitor unit which displays the object and enhanced representative points if the running path of the vehicle crosses the object. The location-allocation model is created using heights of cameras.

In accordance with this invention, a vehicle part which may hit an object is enhanced and displayed on screen together with the object. This facilitates driver's safety activities. In other words, the driver can quickly decide a possibility of collision of the vehicle and take an appropriate action to avoid the collision.

BRIEF DESCRIPTION OF THE DRAWINGS

FIG. 3 shows a principle of cameras with a range measurement function.

DESCRIPTION OF THE PREFERRED EMBODIMENTS

Figure 1:
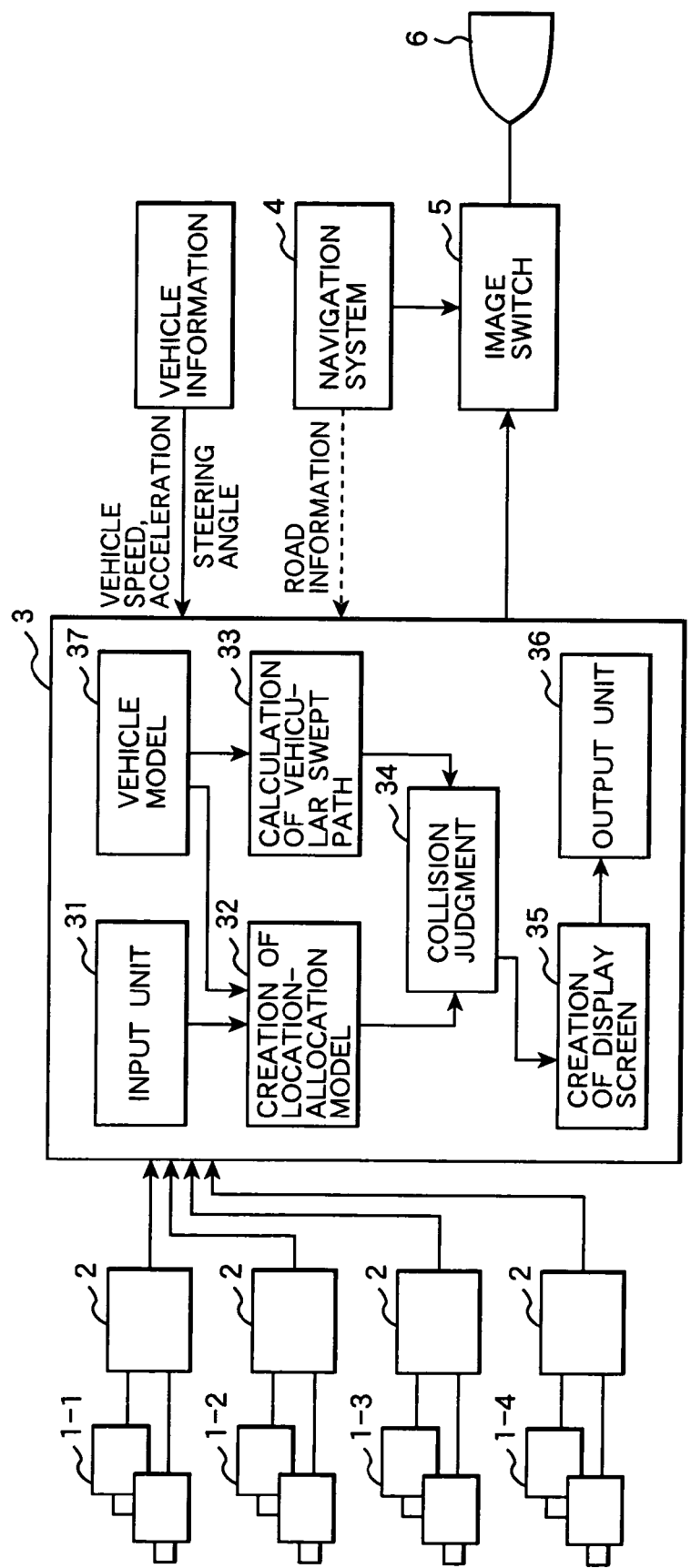
FIG. 1 shows a functional block diagram of a system of monitoring around a vehicle which is an embodiment of this invention.

Below will be explained a preferred embodiment of this invention with reference to the accompanying drawings. FIG. 1 shows a functional block diagram of a system of monitoring around a vehicle which is an embodiment of this invention. This system is equipped with a pair of CCD cameras (1-1 to 1-4), image processor 2, integrated processing unit 3, car navigation system 4, image switching unit 5, and monitor unit 6.

Figure 2A:
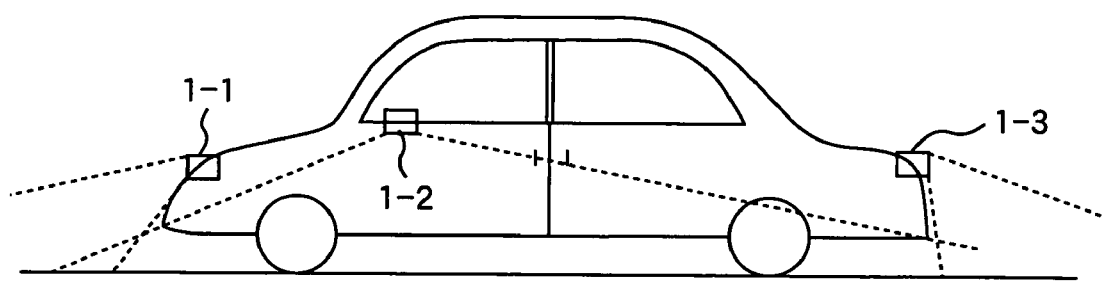
FIG. 2A shows a side view of a vehicle on which the cameras are provided.
Figure 2B:
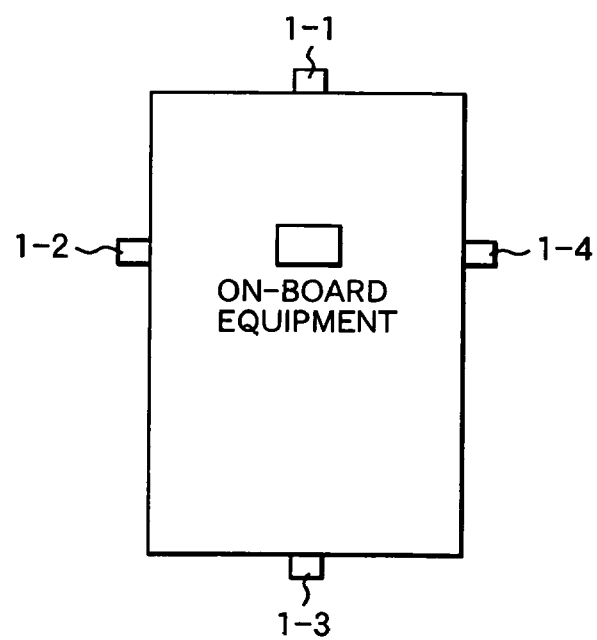
FIG. 2B shows a top view of a vehicle on which the cameras are provided.

Plural CCD cameras 1 are provided on a vehicle. FIGS. 2A and 2B show positions on which the cameras are provided. FIG. 2A shows a side view of the vehicle with the CCD cameras and FIG. 2B shows a top view of the vehicle. The cameras in this embodiment are respectively provided on the front end of the vehicle, near left and right side mirrors, and on the rear end of the vehicle.

A set of CCD cameras 1 and image processor 2 is called cameras with a range measurement function. Image processor 2 calculates a distance of each pixel.

FIG. 3 shows a principle of cameras with a range measurement function. This system contains two CCD cameras 1. Distance Z between an object and the cameras is expressed by Equation (1).

$$Z = B \times f/(x1-x2)$$

where

B is a distance between left and right CCD cameras.

f is a focal length.

x1 is a distance between the center of an image plane and point L at which the image plane intersects with a left (dotted) line which connects the focal point of the camera and an object.

x2 is a distance between the center of an image plane and point R at which the image plane intersects with a right (dotted) line which connects the focal point of the camera and an object.

Integrated processing unit 3 is an on-board equipment and contains a computer and a storage unit. Integrated processing unit 3 further contains input unit 31 which enters range images and location-allocation model creation unit 32 which creates an obstacle location-allocation model from road surface images which were created considering range images and heights of CCD cameras 1 (1-1 to 1-4) above road surfaces.

Furthermore, integrated processing unit 3 contains vehicular swept path calculating unit 33 which calculates a swept path of the vehicle, a collision judgment unit 34 which judges a possibility of collision of the vehicle with an object, and a vehicle model storage unit 37. Vehicle model storage unit 37 supplies a vehicle model to vehicular swept path calculating unit 33 and information of heights of CCD cameras 1 (1-1 to 1-4) above road surfaces to location-allocation model creation unit 32.

Still further, integrated processing unit 3 contains display screen creating unit 35 which highlights portions of a vehicle to collide with an object (hereinafter called an obstacle) by blinking or enlargement and output unit 36 which outputs created screen images.

Car navigation system 4 receives GPS signals and speed pulses of the own vehicle and supplies front (or rear) road guide images of the vehicle to image switching unit 5. If the road is narrow or the vehicle passes the other vehicle, a road image can be supplied to vehicular swept path calculating unit 33 instead of information about heights of CCD cameras 1 (1-1 to 1-4) above road surfaces.

Image switching unit 5 usually receives a road guide screen from the car navigation system 4 and outputs it to monitor unit 6. When integrated processing unit 3 finds a possibility of collision of the vehicle with an obstacle, display screen creating unit 34 outputs a collision image to monitor unit 6.

Figure 4:
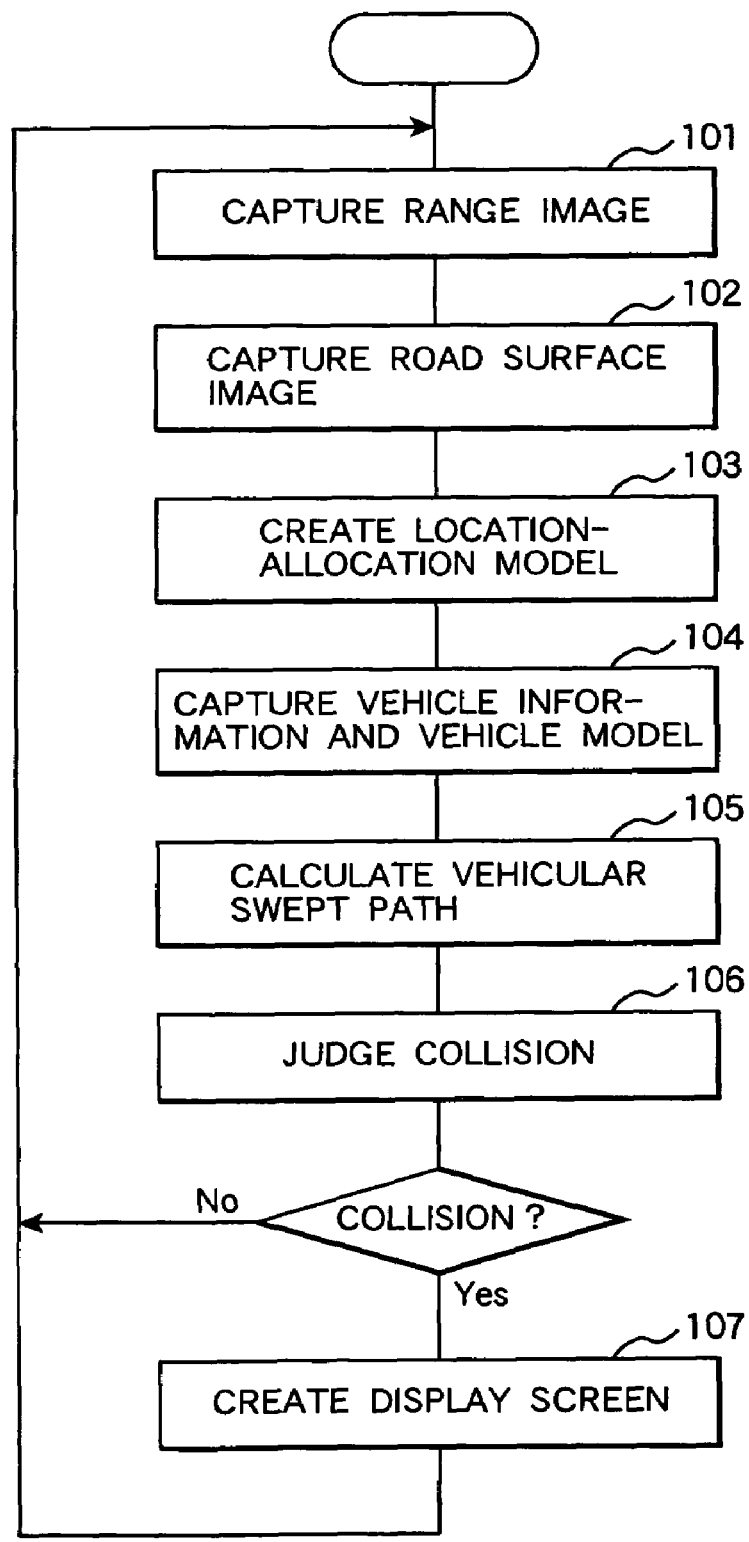
FIG. 4 shows an operation flow of the integrated processing unit in one embodiment of this invention.

Below will be explained operations of the system of monitoring around a vehicle. FIG. 4 shows an operation flow of the integrated processing unit in one embodiment of this invention.

At Step 101, the integrated processing unit captures range images from cameras with a range measurement function. Usually, the range scale of range images can be determined in a place required for obstacle monitoring. However, it is possible to change the range scale according to the vehicle speed and widen the range scale as the vehicle speed increases.

In this embodiment, front, rear, left, and right images are respectively captured from the four CCD cameras for the following processing, but can be processed in parallel. Further, it is possible to perform the following processing on a composite image obtained by composing the four images. The image processing of the rear or front camera can be omitted when the vehicle runs ahead or backs.

Next, the integrated processing unit captures a range image from the car navigation system 4 (at Step 102) and creates a location-allocation model of an object from the entered range images and the road surface image (at Step 103).

Figure 5:
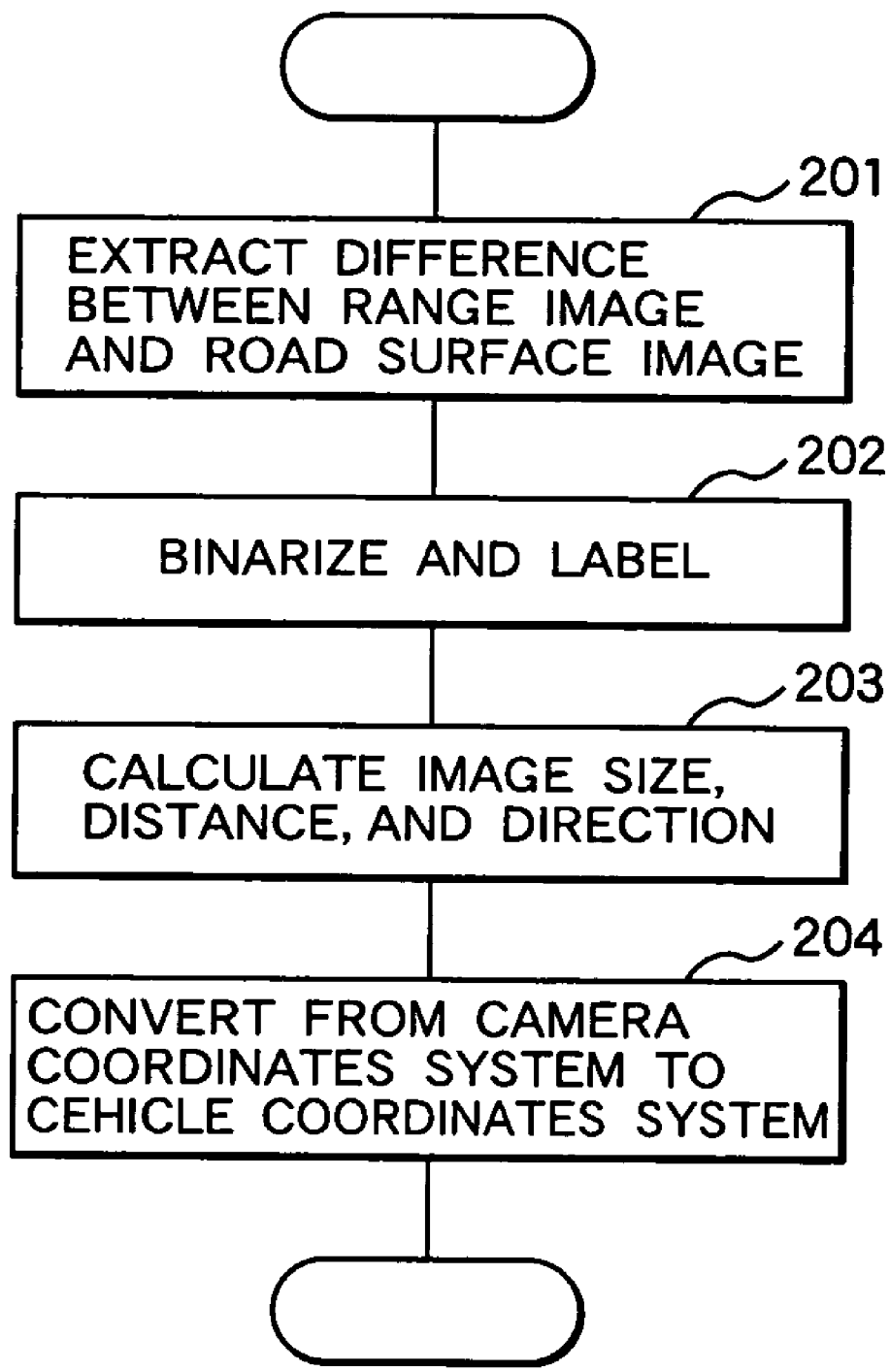
FIG. 5 shows an operation flow of creating an obstacle location-allocation model in one embodiment.

FIG. 5 shows an operation flow of creating an obstacle location-allocation model. The operation flow consists of the steps of extracting a difference between the range image and the road surface image (at Step 201), binarizing the differential image and labeling plural objects (at Step 202), calculating the size (width and height), distance, and orientation of each object (at Step 203), converting the distance and orientation of each object in the camera coordinates system into those of the vehicle coordinates system (at Step 204) which has the gravity center of the vehicle as the origin of the coordinates system. Here, the coordinates of the gravity center of the vehicle is calculated from a vehicle model which defines the size of the vehicle.

When the size of the object is under a threshold value, the object is excluded from the model. If no more objects are found in the model, the subsequent processing is aborted. Control is returned to Step 101 to start the next camera image processing.

Figure 6:
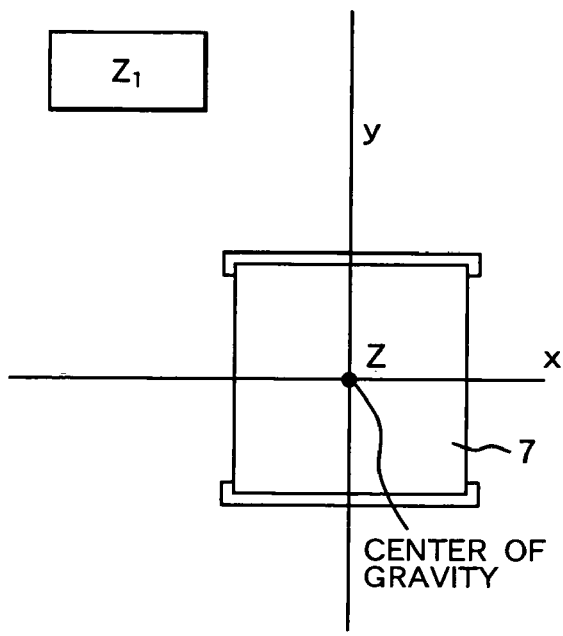
FIG. 6 shows an example of an obstacle location-allocation model.

FIG. 6 shows an example of an obstacle location-allocation model in which a model of object z1 and vehicle 7 is formed on a three-dimensional coordinates system which has three axes (x, y, and z) starting from the gravity center of the vehicle as the origin.

Next, the integrated processing unit captures vehicle information and a velocity model (at Step 104) and calculates the vehicular swept path (at Step 105). The vehicle information contains vehicle velocity v, steering angle θ, acceleration dv, gear position (Forward or Backward), etc. The vehicle model has predetermined representative points such as points on front bumper, rear bumper, four wheels, preset points on the vehicle body (mirror, mud flap, upper part, etc.) and calculates their running paths per small time unit before a preset time in future.

Next, the integrated processing unit judges whether the vehicle crosses the object (at Step 106) by calculating the intersection of the swept paths of representative points of the vehicle with the location-allocation model of the object which was created at Step 103. When the intersection is expected, the object is judged as an obstacle and the relevant representative points are judged as a portion to collide with the obstacle. The intersection contains approach to the inside of a preset distance and the approach distance increases as the vehicle speed becomes higher. It often happens that, if the height of the object is lower than a representative point, the swept path of the point may not intersect with the location-allocation model of the object. In that case, it is possible to abort the judgment of the relevant representative point and go to the judgment of the next representative point.

Figure 7:
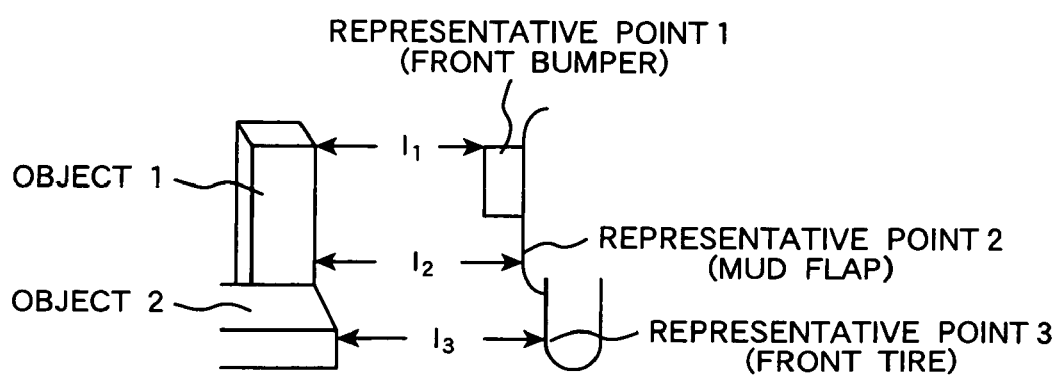
FIG. 7 shows a relationship between representative points and objects.

FIG. 7 shows representative points and objects. Representative point 1 is on the front bumper. Representative point 2 is on the mud flap. Representative point 3 is on the front tire. Objects 1 and 2 are related to these representative points as shown in FIG. 7. 11 to 13 are calculated to judge whether the swept paths of the representative points cross (hit or run on) the objects.

Figure 8:
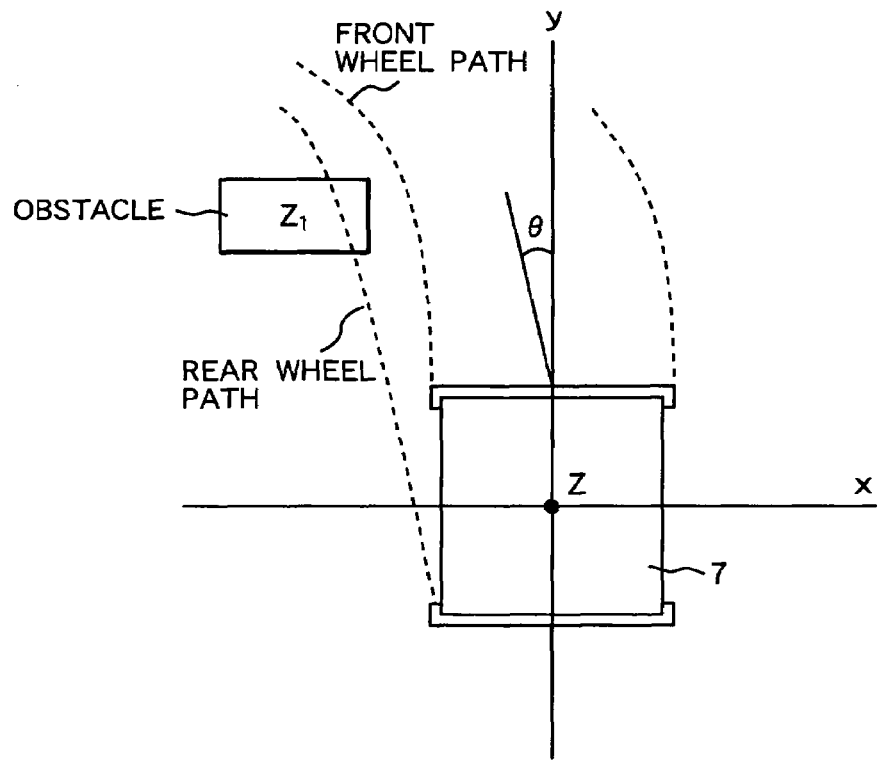
FIG. 8 shows an example which handles an object as an obstacle.

FIG. 8 shows an example which handles an object as an obstacle. When vehicle 7 advances a left at a steering angle of θ, the swept path of the front tire does not cross object z1. However, the swept path of the rear tire crosses (hits or runs on) the object because the vehicular swept path of the rear tire is different from that of the front tire. Therefore, the object is assumed to be obstacle z1.

Figure 9:
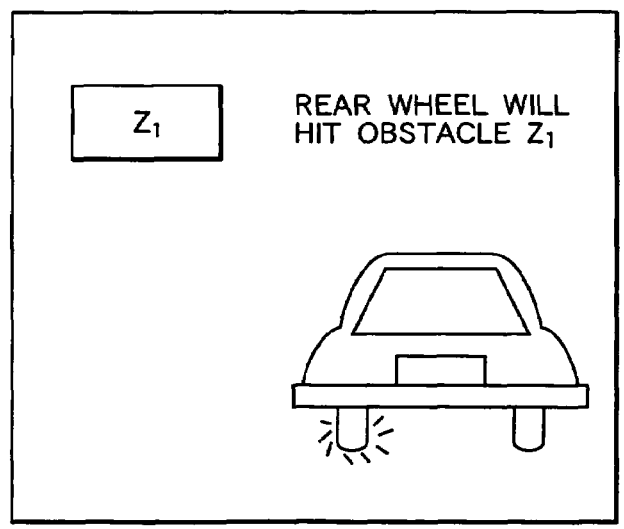
FIG. 9 shows an example of display screen which warns a possibility of collision.

Finally, a display screen is created (at Step 107). When a portion of the vehicle to hit the obstacle is identified as the result of collision judgment at Step 105, a screen is created to display the obstacle and the portion. FIG. 9 shows an example of display screen. The screen displays an obstacle and a tire image (left, right, front, or rear tire) and highlights the expected collision portion of the vehicle by blinking or color changing. It is more effective to display the collision screen together with warning voices or beeps.

When processing on a range image of one camera is completed, control is returned to Step 102 and processing of the next range image starts. This processing is repeated periodically.

As explained above, this embodiment captures range images, creates an obstacle location-allocation model, judges a possibility that the swept path of the vehicle crosses the obstacle, and highlights a portion of the vehicle to cross the obstacle on screen if a collision may be expected. This facilitates driver's safety activities. In other words, the driver can quickly foresee a possibility of collision and take an appropriate action to avoid the collision.

What is claimed is:

1. A method of monitoring around a vehicle by using plural cameras with a range measurement function for finding a distance to an object based on an image, comprising the steps of:
    capturing range images, which include the distance to the object for every pixel, from the cameras which are provided on plural positions of the vehicle,
    creating a location-allocation model of the object which is found in the range images and which is larger than a predetermined threshold value,
    inputting vehicle speed, acceleration, and steering angle values,
    calculating running paths of plural predetermined representative points of the vehicle,
    checking whether the running paths of the vehicle cross the object in the location-allocation model, and
    displaying the object and a part of the vehicle which may hit the object and which corresponds to the predetermined representative point of the vehicle when one of the running paths of the vehicle cross the object.

2. The method of monitoring around a vehicle of claim 1, wherein the location-allocation model is created from range images and road surface images which are created considering heights of cameras above the road surface.

3. A system of monitoring around a vehicle which is equipped with on-board equipment and plural cameras with a range measurement function for finding a distance to an object based on an image, the on-board equipment comprising:
    an input unit which captures range images, which include the distance to the object for every pixel, from the cameras which are provided on plural positions of the vehicle,
    a vehicle storage model unit that stores a vehicle model of the vehicle,
    a location-allocation model creating unit which creates a location-allocation model of the object which is found in the range images and which is larger than a predetermined threshold value,
    a path calculating unit which inputs vehicle speed, acceleration, and steering angle values and calculates running paths of plural predetermined representative points of the vehicle in the vehicle model,
    a collision judging unit which checks whether the running paths of the vehicle cross the object of the location-allocation model, and
    a display screen creating unit that creates a display screen which includes the object and a part of the vehicle which may hit the object and highlights the part of the vehicle when one of the running paths of the vehicle cross the object.

4. The system of monitoring around a vehicle of claim 3, wherein the cameras with a range measurement function are provided on front, left, right, and rear sides of the vehicle.

5. The system of monitoring around a vehicle of claim 3, wherein the adoption and rejection of the range images of cameras with a range measurement function on front and rear sides of the vehicle are determined according to running direction of the vehicle.

6. The system of monitoring around a vehicle of claim 3, wherein the vehicle model storage unit further stores heights of cameras with a range measurement function above road surfaces.

* * * * *